Aug. 19, 1958     M. KRAMCSAK, JR     2,847,696
CASTER
Filed July 2, 1954     2 Sheets-Sheet 1
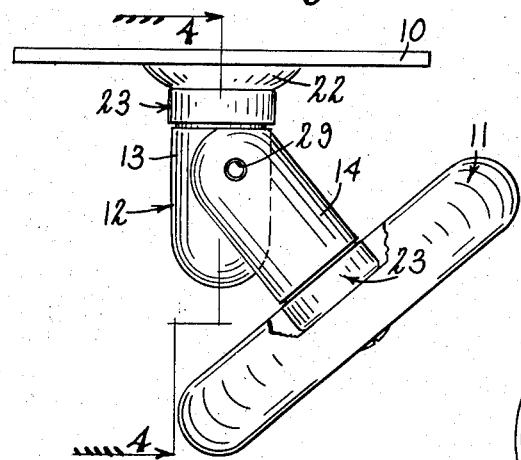
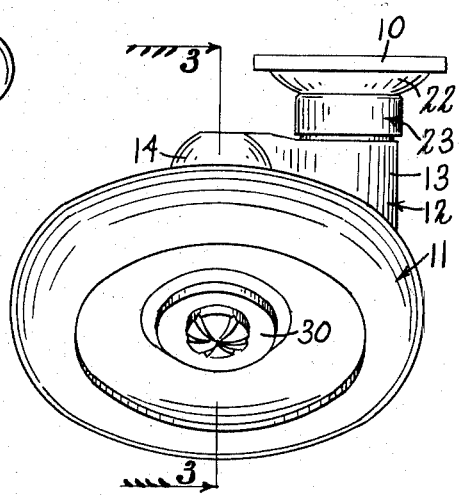
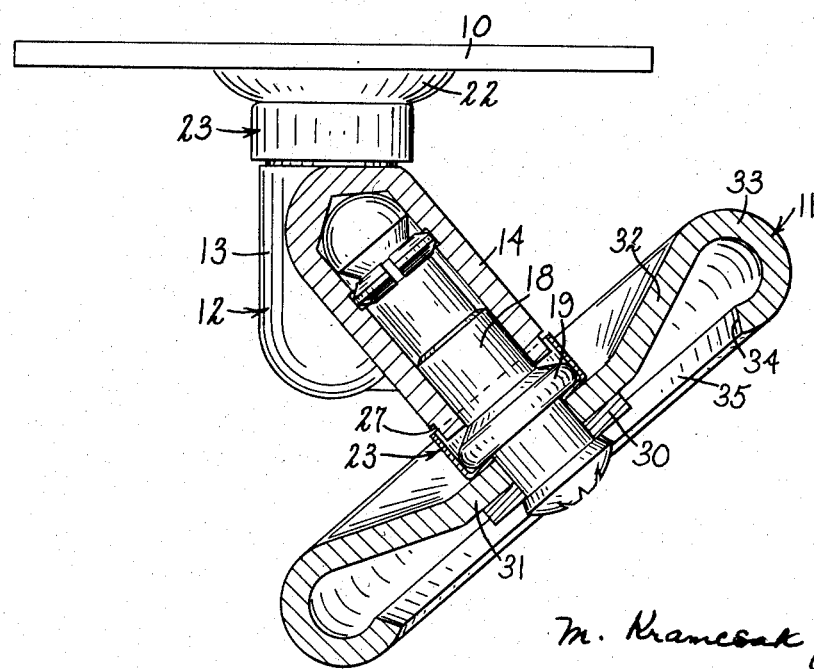
INVENTOR
M. Kramcsak Jr.
BY Rockwell & Bartholow
ATTORNEYS Aug. 19, 1958 M. KRAMCSAK, JR 2,847,696
CASTER Filed July 2, 1954 2 Sheets-Sheet 2

INVENTOR
M. Kramcsak Jr.
BY Rockwell Bartholow
ATTORNEYS

United States Patent Office 2,847,696
Patented Aug. 19, 1958

2,847,696

CASTER

Michael Kramcsak, Jr., Bridgeport, Conn., assignor to The Bassick Company, Bridgeport, Conn., a corporation of Connecticut Application July 2, 1954, Serial No. 441,145

5 Claims. (Cl. 16—20)

This invention relates to casters and more especially to those of the type described in my Patent No. 2,631,328, of March 17, 1953, which are known as double offset casters, although the invention is applicable to casters of other kinds.

In a caster such as shown in the above-mentioned patent, there is a duplex socketed body having an upwardly facing socket part adapted to be positioned vertically, and a laterally offset socket part facing downwardly and having its axis at an acute angle to that of the fixed socket part, one of said socket parts receiving an attaching plate-carrying stem and the other receiving a wheel-carrying stem. The present invention is particularly desirable for use in such a structure.

An object of the present invention is to furnish improved provisions for lubricating a revoluble stem employed in such a caster and to provide, in addition, a structure having an effective guard against the entrance of dust and dirt into the interior of the caster.

A further purpose, among others, is to provide a masking member or structure which serves to streamline the exterior of the caster and to inhibit interference or catching upon other objects as the wheeled member or vehicle moves over the floor.

In the accompanying drawings:

Fig. 1 is a side elevation of a caster embodying the invention;

Fig. 2 is an elevation at right angles to Fig. 1;

Fig. 3 is a section on line 3—3 of Fig. 2;

Figure 4:
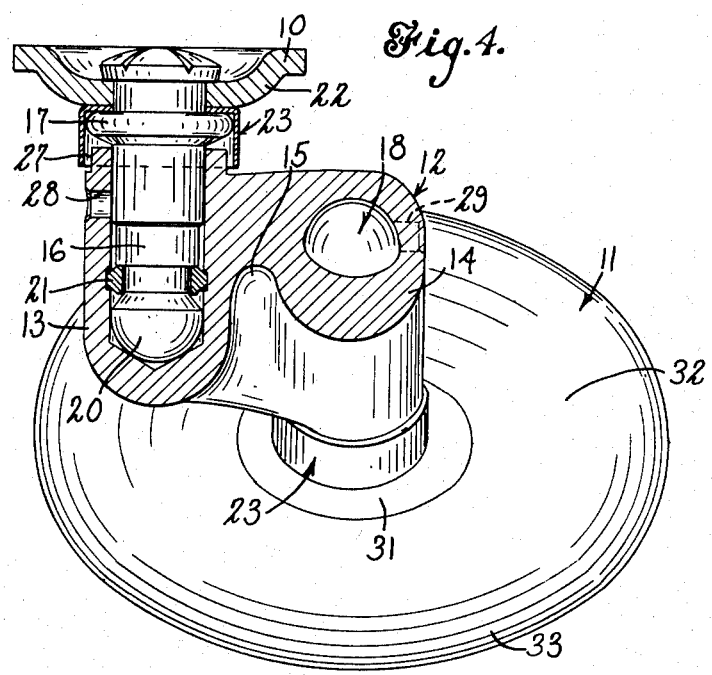
Fig. 4 is a section on line 4—4 of Fig. 1.
Figure 5:
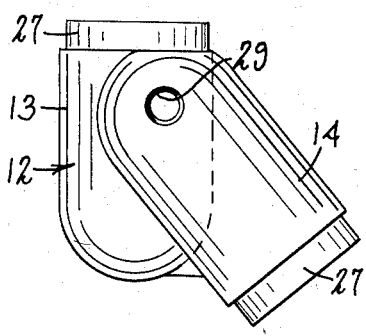
Fig. 5 is a side elevation of the duplex body.
Figure 6:
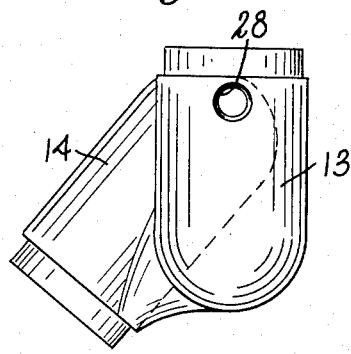
Fig. 6 is an elevation of the body shown in Fig. 5 looking from the opposite side.
Figure 7:
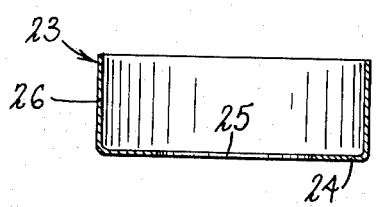
Fig. 7 is a section of one of the sheet metal cups used in the structure.

In the form shown in the drawings, the two socket parts of the caster body are interconnected laterally by a web of metal integral with both of them, as in Patent No. 2,631,328, and the axis of the floor-engaging wheel is arranged at an acute angle to the vertical. The vertical or swiveling stem extends through and is suitably fastened to a cupped attaching plate, and the wheel-carrying stem extends through and is suitably fixed to the central part of the wheel. In the case of each stem, i. e., plate stem or wheel stem, the stem is provided with an outstanding integral collar or supporting flange against which the part to be mounted or carried is securely clamped by staking the adjacent end of the stem. In this particular case, each stem is provided with an expansible locking ring of the kind disclosed in my application Serial No. 204,584, filed January 5, 1951, now abandoned, which prevents or inhibits axial displacement of the stem with respect to its socket, but, if desired, friction rings such as shown in Patent No. 2,631,328 may be used for this purpose.

In the drawings, the attaching plate is indicated at 10, the caster wheel at 11, the duplex socketed body generally at 12, the swivel socket part at 13, the wheel-stem socket part at 14, the connecting web or part between the sockets at 15, the swiveling stem at 16, the supporting flange for the swiveling stem at 17, the wheel-carrying stem at 18, and the supporting flange on the wheel stem at 19. Each of the stems has at the distal end a rounded part adapted to bottom in the corresponding socket, this part being indicated at 20. The locking ring associated with the stem in the manner disclosed in the aforesaid application is indicated at 21. The cupped or depressed portion of the attaching plate to which the swivel stem is fastened is indicated at 22.

In the present article, the stem flanges 17 and 19 instead of being in exposed positions between the stem and the stem-attached member, as in Patent 2,631,328, are masked or covered by suitable members embracing the stems and interposed between the mouth portions of the body sockets and the stem-attached members. In the example shown, the interposed masking members are in the form of sheet metal cups and the two cups are of identical form, each being indicated at 23. Each cup has a bottom 24 provided with a hole 25 and the cup is of cylindrical form having a side wall 26 integral with the bottom wall.

In the case of the swivel stem, the cup 23 is inverted so that its bottom wall is uppermost and this wall has its hole 25 snugly fitted over the upper end of the stem below the attaching plate before the upper end of the stem is headed or staked for the purpose of securing the attaching plate to the stem. As appears from Fig. 4, the interior diameter of the cup is such that the periphery of the flange 17 will substantially engage the cup interiorly with the upper wall of the cup tightly clamped in place by the flange and the attaching plate, and the side wall of the cup depending so as to cover the mouth of the socket part, the lower edge of the cup being somewhat below the level of the mouth of the socket. For the purpose of providing some additional clearance between the socket member mouth and the depending wall of the cup, the mouth of the socket is provided externally with a rabbet 27.

In the operation of the caster, it is important to have proper lubrication, and, for the purpose of permitting the introduction of lubricant such as grease or heavy oil into the swiveling socket, a lubricant hole enters the socket from the side at a point near the upper end of the socket. Such a lubricant hole is indicated at 28. Using this hole 28, the swiveling socket containing the swiveling stem can have grease forced into it under pressure up to a high level (near the top of the socket) so that there will be sufficient grease to lubricate the swiveling parts for a long period of time.

In the case of the wheel-carrying stem 18, the arrangement of the cup 23 is as above described except for the fact that the cup bottom is lowermost rather than uppermost. Its arrangement with respect to the stem flange and the lower mouth portion of the socket is as above described. In this case, however, the lubricant hole is near the closed end of the socket rather than the mouth, a hole 29 entering the socket from the side through the cylindrical wall portion, as indicated in Figs. 1 and 4. In this particular case, the holes 28 and 29 are at the remote sides of the two sockets, the hole 29 being at a somewhat lower level than hole 28.

With reference to the lubrication of the stems and particularly the rotatable wheel-carrying stem, it is to be noted that grease forced downwardly into the socket for this stem may be forced into the cup by the pressure on the grease, and the lubricant will be retained within the stem socket by the underlying cup, thus considerably improving the lubrication of the wheel-carrying stem. The cup is tightly held to the wheel and its side wall is in practice quite close to the mouth of the stem socket. Fig. 3 is larger than actual size and the spacing between these parts is somewhat exaggerated. The upper cup also has a close relationship to the corresponding socket part so as to retain lubricant.

In the example shown, the staking of the end of the wheel stem will not be directly against the wheel body, but against an interposed metal washer 30 which abuts the body of the wheel over a substantial area.

With respect to the wheel 11, which is stamped up from sheet metal, this can be of a special profile, as shown in Fig. 3. The hub portion of this wheel, indicated at 31, is at right angles to the stem, but this portion has integral with it a portion 32 sloping upwardly and radially outwardly at a slight angle and integrally joined to a peripheral lip portion 33. The hub portion 31 presents a flat face against which the bottom of the adjacent cup is tightly clamped. The lip portion 33 has in cross section a curve extending over somewhat more than half of a circle and terminating at a flange, indicated at 34, turned inwardly and slightly upwardly and leaving a recess 35 of considerable area at the lower face of the wheel. The part 33 forms a curled-in lip formed on a radius, and, when the wheel is contacted with the floor, there will be a line contact externally of this lip at some distance from the lip edge. The upper face of the wheel presents a shallow dished formation, as shown in Fig. 3, but the part of this which is below the turning axis is sloped downwardly and outwardly, as shown, so that any object or material dropping upon the upper face of the wheel will tend to be discharged or to run off onto the floor.

The described structure adjacent the mouths of the sockets is not only of advantage in connection with the lubrication of the caster as above described, but is advantageous in streamlining the caster and inhibiting interference or catching upon other objects as the vehicle body moves over the floor. This applies, for example, in the case where the casters are used on an industrial truck or a moving platform used in a factory. The cups 23 serve as masking members for parts employed in previous casters that offered external projections that were likely to catch upon other objects and to serve as a resting place of dirt or other objectionable matter. It is to be noted that in the present construction there is an entire absence of such projecting parts, each cup extending partially over the adjacent socket mouth and having a smooth cylindrical exterior of substantially the same diameter as the mouth of the socket so as to provide, in effect, a continuation of the socket by which the latter in conjunction with the adjacent stem flange is effectively covered and closed with complete masking of the flange.

Moreover, the hereindescribed structure has advantage as providing an effective thread guard, this being particularly true in connection with the wheel of the caster. In factories where pieces of thread are likely to be present on the floor, there is ordinarily considerable likelihood of threads becoming entangled with the wheel at the upper face thereof and winding up around the wheel stem. In the case of the wheel employed in the present caster, the bottom of the cup is tightly clamped between the wheel web and the stem shoulder so that a thread cannot enter a space immediately below the shoulder. On the other hand, a thread cannot wind up on the stem in the region at and above the shoulder on account of the effective guard created by the side wall of the cup and the close fit of the mouth portion of the cup with the mouth portion of the socket member, as described above.

With reference to the wheel form, it has been mentioned that any object or material dropping upon the upper face of the wheel will tend to be discharged or to run off onto the floor. This is of advantage, for example, when the truck is used in a shoe factory. Threads or the like dropping upon the upper face of the wheel will tend to be thrown off so as to drop upon the floor, and a substance such as hot wax, dropped upon the upper face of the wheel, will tend to run off by gravity and/or centrifugal effect before hardening. Thus collection of objectionable matter on this wheel face which might interfere with the proper functioning of the caster is inhibited.

Broadly speaking, the wheel and the attaching fixture are referred to as perforated webbed members clampingly positioned by the collars or flanges on the parts of the stems protruding from the sockets.

It is to be understood that the present disclosure is by way of example, and that various modifications and changes in the details may be made without departing from the scope of the claims.

What I claim is:

1. In a caster, a body having an elongated socket part inclined at an acute angle to the vertical, closed at its upper end and open at its lower end, a stem bottoming in the socket part and having an outstanding integral clamping collar adjacent and outwardly of the open end of the socket, the stem being provided outwardly of said collar with a stem extension, a wheel having a flat apertured web portion secured to the stem extension outwardly of the collar, the wheel including a shallow truncated-conical section extending upwardly from the web portion and a generally semi-torroidal rim section extending downwardly from the outer end of the conical section and terminating at a line somewhat beyond a floor-contacting line of the torroidal section, all parts of the web and conical surfaces, when in their lowermost positions, extending downwardly toward the rim section at an acute angle with the floor to inhibit lodgment of foreign elements on the upper face of the wheel, and a cup-shaped member having its bottom interposed between the outer face of the collar and the surface of the wheel, the cup-shaped member extending over and enclosing the collar and having a side wall whose distal edge circumferentially encloses the open end of the socket part in close proximity thereto to give full enclosure to the open end as well as to the collar.

2. The combination claimed in claim 1 together with an inlet on the socket part intermediate its ends for introducing substantially viscous lubricants into the socket interior under pressure, the side wall of the cup-shaped member having an external diameter substantially the same as that of the socket part and an internal diameter substantially the same as the collar diameter, the open end of the socket part being necked down to be received in the side wall of the cup-shaped member, the external lower surface of the socket part, the juxtaposed inner surface of the collar, and the juxtaposed internal side wall surface of the cup-shaped member retaining a substantial amount of lubricant for preventing exhaustion of lubricant from the socket and for preventing the entry of foreign material into the socket part, and the necked down portion of the socket part and the juxtaposed portion of the side wall of the cup-shaped member defining a restricted, visible, and easily accessible venting annulus intermediate the ends of the socket part, thereby to provide for manually controlled scavenging of the lubricant retaining spaces in the caster and to permit breathing of the lubricant supply.

3. A caster comprising a duplex socketed body, the body having an upwardly facing socket part adapted for vertical positioning and having a lateral off-set socket part facing downwardly at an acute angle, the outer periphery of the sockets being necked down at their open ends, a pair of stems bottoming in the socket parts and having collars adjacent the open ends of the socket parts, each stem being provided outwardly of its respective collar with a stem extension, an apertured attaching member embracing the vertical stem extension outwardly of the collar, a wheel having a flat apertured web portion secured to the other stem extension outwardly of the collar, the wheel including a shallow truncated-conical section extending upwardly from the web portion and a generally semi-torroidal rim section extending downwardly from the outer end of the conical section and terminating at a line somewhat beyond a floor-contacting line of the torroidal section, all parts of the web and conical surface, when in their lowermost positions, extending downwardly toward the rim section at an acute angle with the floor to inhibit lodgment of foreign elements on the upper face of the wheel, a pair of cup-shaped members having their bottoms secured between their respective collars and their respective attaching member and wheel, the cup-shaped members extending over and enclosing their respective collars and having side walls with external diameters substantially the same as that of the socket parts and with their distal edges circumferentially enclosing the necked down open ends of the socket parts in close proximity thereto to give full enclosure to the open socket ends as well as to the collar, the side walls being in close engagement with the peripheries of the collars.

4. The combination claimed in claim 3, together with an inlet on each socket part intermediate the socket ends for introducing substantially viscous lubricants into the socket interiors under pressure, the external surfaces of the open ends of the socket parts, the adjacent inner surface of the collars, and the adjacent side walls of the cup-shaped members retaining a substantial amount of lubricant for preventing exhaustion of lubricant from the sockets and for preventing the entry of foreign material into the socket parts, and the necked down sections of the socket parts and the juxtaposed portions of the side walls of the cup-shaped members defining restricted, visible, and easily accessible venting annuli intermediate the ends of the socket parts thereby to provide for manually controlled scavenging of the lubricant retaining spaces in the caster and to permit breathing of the lubricant supply.

5. In a caster, a body having an elongated socket part inclined at an acute angle to the vertical, closed at its upper end and open at its lower end, a stem bottoming in the socket part and having an outstanding integral clamping collar adjacent and outwardly of the open end of the socket, the stem being provided outwardly of said collar with a stem extension, a wheel secured to the stem extension, a cup-shaped member carried by the stem extension and having its bottom interposed between the collar and the wheel, the member having a side wall with an internal diameter substantially the same as the collar diameter and extending over and enclosing the collar diameter, the side wall having an external diameter substantially the same as that of the socket part, the open end of the socket being necked down to be received in and circumferentially enclosed by the distal edge of the side wall in close proximity thereto, an inlet on the socket part intermediate its ends for introducing substantially viscous lubricants into the socket interior under pressure, the external lower surface of the socket part, the juxtaposed inner surface of the collar, and the juxtaposed internal side wall surface of the cup-shaped member retaining a substantial amount of lubricant for preventing exhaustion of lubricant from the socket and for preventing the entry of foreign material into the socket part, and the necked down portion of the socket part and the juxtaposed portion of the side wall of the cup-shaped member defining a restricted, visible, and easily accessible venting annulus intermediate the ends of the socket part, thereby to provide for manually controlled scavenging of the lubricant retaining spaces in the caster and to permit breathing of the lubricant supply.

References Cited in the file of this patent

UNITED STATES PATENTS

| | | |
|---|---|---|
| 42,382 | Knisely | Apr. 19, 1864 |
| 591,847 | Kiessling | Oct. 19, 1897 |
| 912,010 | Martin | Feb. 9, 1909 |
| 1,582,795 | Smith | Apr. 27, 1926 |
| 1,585,758 | Buckwalter | May 25, 1926 |
| 2,589,847 | Noelting et al. | Mar. 18, 1952 |
| 2,631,328 | Kramcsak | Mar. 17, 1953 |

FOREIGN PATENTS

| | | |
|---|---|---|
| 320,240 | Great Britain | Oct. 10, 1929 |
| 918,001 | France | Jan. 28, 1946 |

OTHER REFERENCES

Textile World (periodical) October 1949, page 248–9 Article entitled, "Textile-Caster Design Cuts Maintenance Costs."